(12) United States Patent
Morimoto et al.

(10) Patent No.: US 11,360,975 B2
(45) Date of Patent: Jun. 14, 2022

(54) DATA PROVIDING APPARATUS AND DATA PROVIDING METHOD

(71) Applicant: FUJITSU LIMITED, Kawasaki (JP)

(72) Inventors: Hidekazu Morimoto, Numazu (JP); Shinichi Kariya, Shizuoka (JP); Takeshi Ryuutou, Numazu (JP); Naoko Kitamura, Shizuoka (JP); Masakats Yamada, Numazu (JP); Masako Miyazawa, Numazu (JP); Toshinori Nanba, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 16/105,270

(22) Filed: Aug. 20, 2018

(65) Prior Publication Data
US 2019/0065551 A1    Feb. 28, 2019

(30) Foreign Application Priority Data

Aug. 22, 2017 (JP) .............................. JP2017-159414

(51) Int. Cl.
*G06F 16/2453* (2019.01)
*G06F 16/27* (2019.01)

(52) U.S. Cl.
CPC ........ *G06F 16/24542* (2019.01); *G06F 16/27* (2019.01)

(58) Field of Classification Search
CPC ............................ G06F 16/24542; G06F 16/27
USPC ....................................................... 707/770
See application file for complete search history.

(56) References Cited

U.S. PATENT DOCUMENTS

| | | | | |
|---|---|---|---|---|
| 6,466,931 B1 * | 10/2002 | Attaluri | ............. | G06F 16/24524 |
| 6,466,951 B1 * | 10/2002 | Birkler | ..................... | G06F 16/27 |
| 2003/0158842 A1 * | 8/2003 | Levy | .................. | G06F 16/24532 |
| 2008/0010240 A1 * | 1/2008 | Zait | ................... | G06F 16/24542 |
| 2008/0294630 A1 | 11/2008 | Yan et al. | | |

(Continued)

FOREIGN PATENT DOCUMENTS

| | | |
|---|---|---|
| JP | 2008-287660 | 11/2008 |
| JP | 2010-530566 A | 9/2010 |

(Continued)

OTHER PUBLICATIONS

JPOA,,Office Action of Japanese Patent Application No. 2017-159414 dated May 25, 2021 with Machine Translation.

(Continued)

*Primary Examiner* — Michael Pham
(74) *Attorney, Agent, or Firm* — Fujitsu Patent Center

(57) ABSTRACT

A data providing apparatus includes circuitry configured to store a query as a candidate query in a first memory in association with an execution plan and store data in a second memory when receiving the execution plan and the data from a database server in response to transmitting the query to the database server, perform searching the first memory for a first candidate query having content corresponding to content of a first query in response to receiving the first query from a first request source, when the first candidate query is detected by the searching, select a first execution plan associated with the first candidate query by referring to the first memory, extract specific data from the second memory on the basis of the selected first execution plan, and transmit the specific data to the first request source.

15 Claims, 10 Drawing Sheets

(56) References Cited

U.S. PATENT DOCUMENTS

| | | | |
|---|---|---|---|
| 2009/0276394 A1* | 11/2009 | Bestgen | G06F 16/24542 |
| 2010/0306188 A1* | 12/2010 | Cunningham | G06F 16/24542 |
| | | | 707/713 |
| 2011/0072006 A1* | 3/2011 | Yu | G06F 16/24535 |
| | | | 707/718 |
| 2013/0144867 A1* | 6/2013 | Tanaka | G06F 16/24554 |
| | | | 707/718 |
| 2013/0159286 A1* | 6/2013 | Manzano Macho | |
| | | | G06F 16/24552 |
| | | | 707/718 |
| 2013/0166588 A1* | 6/2013 | Gruschko | G06F 16/00 |
| | | | 707/769 |
| 2014/0046928 A1* | 2/2014 | Konik | G06F 16/24542 |
| | | | 707/718 |
| 2015/0112966 A1* | 4/2015 | Tokuda | G06F 16/24549 |
| | | | 707/718 |
| 2016/0239542 A1* | 8/2016 | Yu | G06F 16/24542 |
| 2018/0225331 A1* | 8/2018 | Agrawal | G06F 16/24534 |
| 2018/0349404 A1* | 12/2018 | Noh | G06F 16/24534 |

FOREIGN PATENT DOCUMENTS

| | | |
|---|---|---|
| JP | 2013-50864 A | 3/2013 |
| JP | 2015-197909 | 11/2015 |

OTHER PUBLICATIONS

Kato, Shohei, Oracle, Beginner must read! "Basic knowledge of the SQL tuning which we want to acquire", Monthly DB Magazine, Jun. 2009, SHOEISHA Co., Ltd., Jun. 1, 2009, vol. 19, No. 2, pp. 106-117, with Machine Translation of JPOA dated May 25, 2021 corresponding to Japanese Patent Application No. 2017-159414.

Japanese Office Action dated May 25, 2021 for corresponding Japanese Patent Application No. 2017-159414, with Machine English Translation, 5 pages.

* cited by examiner

| a11 | a12 | a13 | a14 |
| a21 | a22 | a23 | a24 |
| a31 | a32 | a33 | a34 |
| a41 | a42 | a43 | a44 |

| a11 |     | a13 | a14 |
|     |     |     |     |
| a31 | a32 | a33 | a34 |
| a41 | a42 |     | a44 |

| 1 | 0 | 1 | 1 |
| 0 | 0 | 0 | 0 |
| 1 | 1 | 1 | 1 |
| 1 | 1 | 0 | 1 |

FIG. 8

NORMALIZED SQL STATEMENT

SELECT a1, a2, b1 FROM A, B
WHERE a2 in (10, 20, 30)
and a1 = b1
and 10 < a4 < 100

ORIGINAL SQL
STATEMENT c

SELECT a1, a2, b1 FROM A, B
 WHERE a2 in (10, 20, 30)
    and a1 = b1 /* COMMENT */
    and 10 < a4 < 100

ORIGINAL SQL STATEMENT a

SELECT a1, a2, b1 FROM A, B
 WHERE a2 in (10, 20, 30)
    and b1 = a1
    and 10 < a4 < 100

ORIGINAL SQL STATEMENT b

SELECT a1, a2, b1 FROM A, B
 WHERE a2 in (10, 20, 30)
    and 10 < a4 < 100
    and a1 = b1

DATA PROVIDING APPARATUS AND DATA PROVIDING METHOD

CROSS-REFERENCE TO RELATED APPLICATION

This application is based upon and claims the benefit of priority of the prior Japanese Patent Application No. 2017-159414, filed on Aug. 22, 2017, the entire contents of which are incorporated herein by reference.

FIELD

The present disclosure relates to a data providing technology.

BACKGROUND

A database server executes various processes in response to query statements (also referred to as queries) described in a query language such as a structured query language (SQL). For example, upon receiving a SQL statement (a SQL query), the database server parses the SQL statement based on management information of a database. After completing the parsing of the SQL statement, the database server generates an execution plan that enables the SQL statement to be executed. The database server executes one of the various processes based on the generated execution plan.

If data communication from the database server to a client occurs every time the client transmits a request, load on the database server is increased. Hence, there is a technology by which a cache server holds data having undergone first time reference by a client and provides the client with the data at the time of second time or later reference.

For example, Japanese Laid-open Patent Publication No. 2008-287660 discloses related art.

SUMMARY

According to an aspect of the invention, a data providing apparatus includes circuitry configured to store a query as a candidate query in a first memory in association with an execution plan and store data in a second memory when receiving the execution plan and the data from a database server in response to transmitting the query to the database server, perform searching the first memory for a first candidate query having content corresponding to content of a first query in response to receiving the first query from a first request source, when the first candidate query is detected by the searching, select a first execution plan associated with the first candidate query by referring to the first memory, extract specific data from the second memory on the basis of the selected first execution plan, and transmit the specific data to the first request source.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a table illustrating an example of a table included in a database, FIG. 5B is a table illustrating an example of a table included in a cache database, FIG. 5C is a table illustrating an example of a table filter;

FIG. 8 is a diagram illustrating an example of normalization of SQL statements;

DESCRIPTION OF EMBODIMENTS

Figure 1:
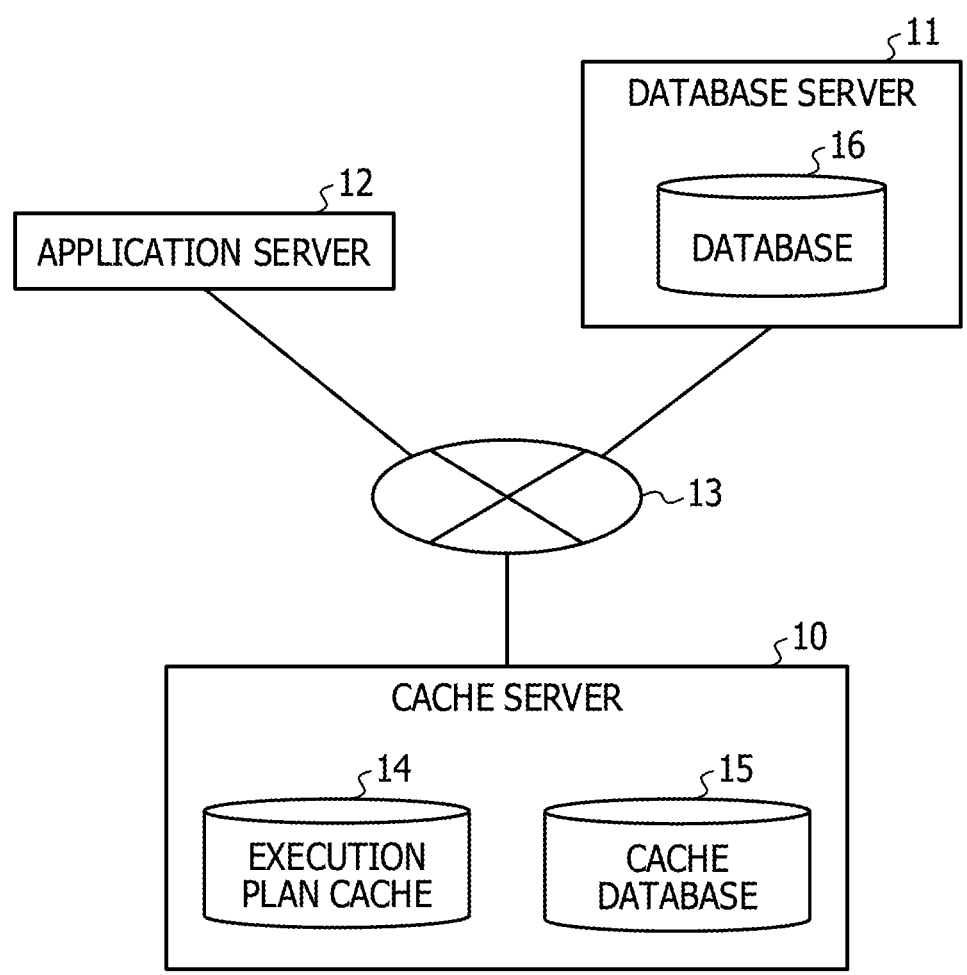
FIG. 1 is a diagram illustrating an example configuration of a server system.

In the related art, even if a cache server is used, but if a database server executes a process for parsing a SQL statement transmitted from a client and generating an execution plan, for example, every time a SQL statement is transmitted, the database server has high processing load.

It is also conceivable that not only the database server but also the cache server itself parses the SQL statement and generates the execution plan. However, in this case, the processing load on the database server is reduced, but parsing the SQL statement by the two servers leads to deterioration of time for a response to the SQL statement and an increase of load on the cache server.

Hereinafter, embodiments will be described in detail with reference to the drawings. Processes in the embodiments may appropriately be combined. Note that the same components are basically denoted by the same reference numerals throughout all of the drawings provided for explaining the embodiments, and repeated explanation is omitted.

First Embodiment

Hereinafter, a first embodiment will be described. FIG. 1 is a diagram illustrating an example configuration of a server system of the first embodiment. The server system of the first embodiment includes a cache server 10, a database server 11, and an application server 12. The cache server 10, the database server 11, and the application server 12 are connected to each other via a network 13.

The application server 12 executes various processes in response to queries from, for example, an unillustrated web server and transmits results to the web server. Each query is described in a query language. Although the SQL is used as the query language in embodiments, the query language is not limited to this.

The database server 11 includes, for example, a database storing data to be used for services and provides the application server 12 with data relevant to a query transmitted from the application server 12. The database server 11 includes a database 16 that is a data aggregate in which data to be used for services are systematically recorded.

The cache server 10 holds at least one of pieces of data recorded in, for example, the database 16 of the database server 11 and provides the application server 12 on behalf of the database server 11 with data relevant to a query transmitted from the application server 12. The cache server 10 includes an execution plan cache 14 and a cache database 15. The cache database 15 reproduces, for example, part of the database 16.

Figure 2:
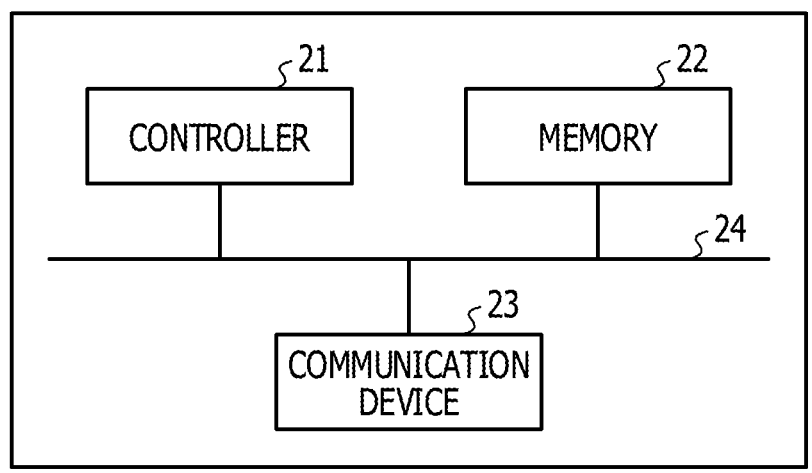
FIG. 2 is a diagram illustrating an example hardware configuration of a database server.

First, the database server 11 will be described. FIG. 2 is a diagram illustrating an example hardware configuration of the database server 11 according to the first embodiment. The database server 11 includes a controller 21, a memory 22, and a communication device 23. These are connected to each other via a system bus 24.

The controller 21 is a device that controls the database server 11. An electronic circuit such as a central processing unit (CPU) or a micro processing unit (MPU) may be used as the controller 21. Based on the operating system (OS) and various programs stored in the memory 22, the controller 21 controls operations of the database server 11 such as various computing processes and data input and output to and from hardware components and executes various processes. The controller 21 runs, for example, a database management system and thereby manages a database. Various pieces of information to be used while a program is being run may be acquired from, for example, the memory 22. Note that some of processes to be executed by the controller 21 may be implemented by using dedicated hardware. The controller 21 executes processes according to the first embodiment based on programs according to the first embodiment.

The memory 22 may include a main memory and an auxiliary memory. The main memory temporarily stores, for example, the OS and at least one of the application programs to be run by the controller 21. The main memory also stores various pieces of data to be used for processing by the controller 21. Note that, for example, a read only memory (ROM) or a random access memory (RAM) may be used as the main memory.

The auxiliary memory stores, for example, an execution program and a control program provided in the database server 11. The auxiliary memory may read and write any of the various pieces of stored information based on an instruction from the controller 21. A storage such as a hard disk drive (HDD) or a solid state drive (SSD) may be used as the auxiliary memory. The auxiliary memory may store information to be used for processing and a result of the processing. In addition, the main memory and the auxiliary memory may mutually share the functions thereof.

For example, based on a control signal from the controller 21, the communication device 23 communicates with the application server 12 and the cache server 10 that are connected via the network 13 as illustrated in FIG. 1.

Hereinafter, specific operations of the controller 21 of the database server 11 will be exemplified. The database server 11 receives a query from the application server 12 directly or indirectly via the cache server 10. The query is described in the SQL. For example, a SELECT statement represents extraction of (reference to) data in the database. In addition, conditions for extracting data may be designated by using various parameters provided together with the SELECT statement. The controller 21 of the database server 11 parses (interprets) a received query in accordance with a SQL syntax rule and generates an execution plan representing a series of processes to be executed, based on the definition information of the database 16 (also referred to as a schema). Note that the execution plan is information in which internal processing steps for a database server to actually perform processing requested by a query are specified in detail.

The controller 21 executes the generated execution plan. In a case of a query regarding reference, the controller 21 executes the execution plan and thereby generates answer data (also referred to as a query result). The controller 21 transmits the execution plan and the answer data to the cache server 10. The controller 21 transmits part of the definition information of the database 16 to the cache server 10 in some cases, the part being related to processing of the execution plan.

Figure 3:
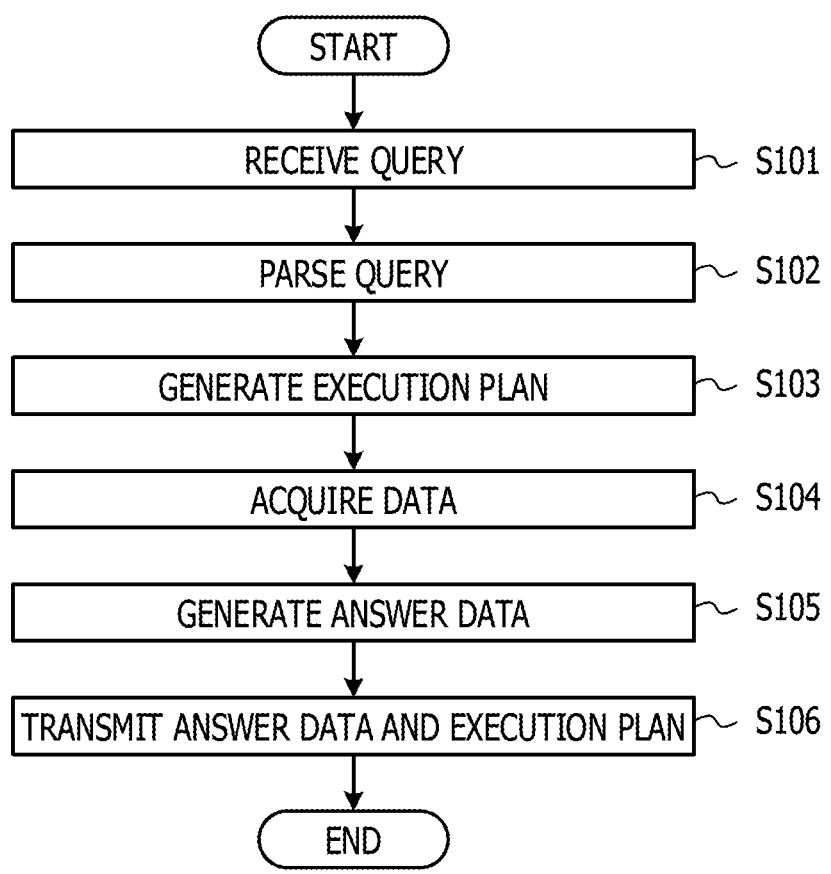
FIG. 3 is a flowchart illustrating an example of processing steps performed by the database server.

An example of processing steps for a query performed by the database server 11 according to the first embodiment will be described. FIG. 3 is a flowchart illustrating an example of the processing steps performed by the database server 11. Note that the example exemplifies a case where a query includes data reference.

For example, the database server 11 receives a query transmitted from the application server 12 via the cache server 10 (S101). The controller 21 parses the SQL statement included in the received query based on the SQL syntax rule and the definition information of the database 16 (S102). After the parsing, the controller 21 generates an execution plan associated with the query (S103). For example, the controller 21 may generate a plurality of execution plans associated with the query.

The controller 21 executes the generated execution plan and acquires data relevant to the execution plan from the database 16 stored in the memory 22 (S104). If there is a plurality of execution plans, the controller 21 may select and execute one of the execution plans that enables processing to be completed most efficiently and in the shortest time.

The controller 21 generates answer data for the query based on the acquired data (S105). The answer data may be, for example, tabular data.

The controller 21 controls the communication device 23 and transmits, to the cache server 10, the generated answer data and the execution plan as a response to the query (S106).

In this case, the cache server 10 transmits, to the application server 12 that is a query source, the answer data transmitted to the cache server 10. The controller 21 may not only perform S106 but also transmit the generated answer data directly to the application server 12.

Figure 4:
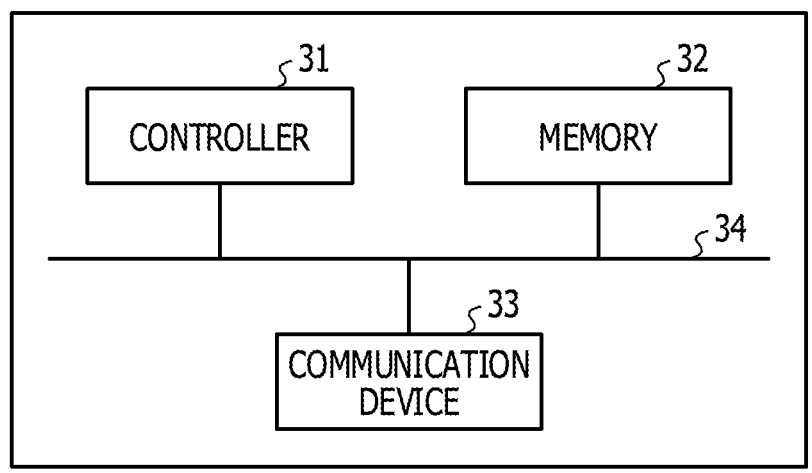
FIG. 4 is a diagram illustrating an example hardware configuration of a cache server.

Next, the cache server 10 will be described. FIG. 4 is a diagram illustrating an example hardware configuration of the cache server 10 according to the first embodiment. The cache server 10 includes a controller 31, a memory 32, and a communication device 33. These are connected to each other via a system bus 34.

The controller 31 is a device that controls the cache server 10. An electronic circuit such as a CPU or a MPU may be used as the controller 31. Based on the OS and various programs stored in the memory 32, the controller 31 controls operations of the cache server 10 such as various computing processes and data input and output to and from hardware components and executes various processes. Various pieces of information to be used while a program is being run may be acquired from, for example, the memory 32. Note that some of processes to be executed by the controller 31 may be implemented by using dedicated hardware. The controller 31 executes processes according to the first embodiment based on programs according to the first embodiment.

The memory 32 may include a main memory and an auxiliary memory. The main memory temporarily stores, for example, the OS and at least one of the application programs to be executed by the controller 31. The main memory also stores various pieces of data to be used for processing by the controller 31. Note that, for example, a ROM or a RAM may be used as the main memory.

The auxiliary memory stores, for example, an execution program and a control program provided in the cache server 10. The auxiliary memory may read and write any of the various pieces of stored information based on an instruction from the controller 31. A storage such as a HDD or a SSD may be used as the auxiliary memory. The auxiliary memory may store information to be used for processing and a result of the processing. In addition, the main memory and the auxiliary memory may mutually share the functions thereof.

For example, based on a control signal from the controller 31, the communication device 33 communicates with the application server 12 and the database server 11 that are connected via the network 13 as illustrated in FIG. 1.

Hereinafter, specific operations of the controller 31 of the cache server 10 will be exemplified. The cache server 10 includes the execution plan cache 14 and the cache database 15. In the execution plan cache 14, each execution plan generated by the database server 11 is stored in association with a query based on which the execution plan is generated. The cache server 10 receives an execution plan and answer data from the database server 11. The controller 31 of the cache server 10 stores the received execution plan in the execution plan cache 14 in association with the query. The controller 31 stores the received answer data in the cache database 15. When storing the answer data in the cache database 15, the controller 31 stores the answer data to cause the cache database 15 to have the same configuration as that of part of the database 16, based on the definition information regarding the part of the database 16, the definition information being received from the database server 11. This causes the cache database 15 to reproduce the part of the database 16 of the database server 11.

More specific description will be provided with reference to FIGS. 5A and 5B. FIG. 5A is a table illustrating an example of a table included in the database 16. FIG. 5B is a table illustrating an example of a table included in the cache database 15. Note that the database 16 is, for example, a relational database (RDB) in which data is managed in a tabular form.

The database 16 includes a table 50. For example, the cache server 10 receives, from the database server 11, pieces of data a11, a13, a14, a31, a32, a33, a34, a41, a42, and a44 as one or more pieces of answer data for one or more queries. In this case, the cache server 10 stores each of the pieces of data in a table 51 included in the cache database 15. In the table 51, the same pieces of data as those each in a field in the corresponding record and in the corresponding column of the table 50 are stored, and part of the table 50 is reproduced.

FIG. 5C is a table illustrating an example of a table filter. The cache server 10 may have a table filter 52 in association with the table 51. The table filter 52 stores 1 in fields of the table filter 52 in the same locations as fields in the table 51 having data stored therein and stores 0 in fields of the table filter 52 in the same locations as fields in the table 51 not having data stored therein.

The controller 31 may judge whether data is present in each field of the table 51 based on the table filter 52. For example, if all of pieces of data in a record in the fourth line in the table 51 are to be used, the controller 31 multiplies together all of values in the record in the fourth line in the table filter 52. If the multiplication result is 0, the controller 31 may judge that at least one of pieces of data is absent in the record in the fourth line in the table 51. As described above, the controller 31 may judge whether data included in the cache database 15 is usable.

Upon receiving a new query to the database server 11 from the application server 12, the controller 31 compares the SQL statement included in the query with the SQL statement included in each query associated with an execution plan in the execution plan cache 14 (hereinafter, also referred to as a candidate query) and judges whether a candidate query having content corresponding to the content of the query is present. Note that in the comparison, the query and the candidate query are simply handled as a character string and the parsing based on the SQL is not performed. For example, if the character string of the SQL statement included in the query matches the character string of the SQL statement included in the candidate query, the controller 31 may judge that the query and the candidate query correspond to each other. The character string may include, for example, a character, a numeral, a symbol, or a space character.

If the candidate query having the content corresponding to the content of the query is detected, an execution plan associated with the detected candidate query is identified, and the identified execution plan is executed. The controller 31 executes the execution plan, thereby generates answer data from the cache database 15, and transmits the answer data as a response to the query to the application server 12 on behalf of the database server 11.

If the candidate query having the content corresponding to the content of the query is not detected, the controller 31 transmits the received query to the database server 11.

Figure 6:
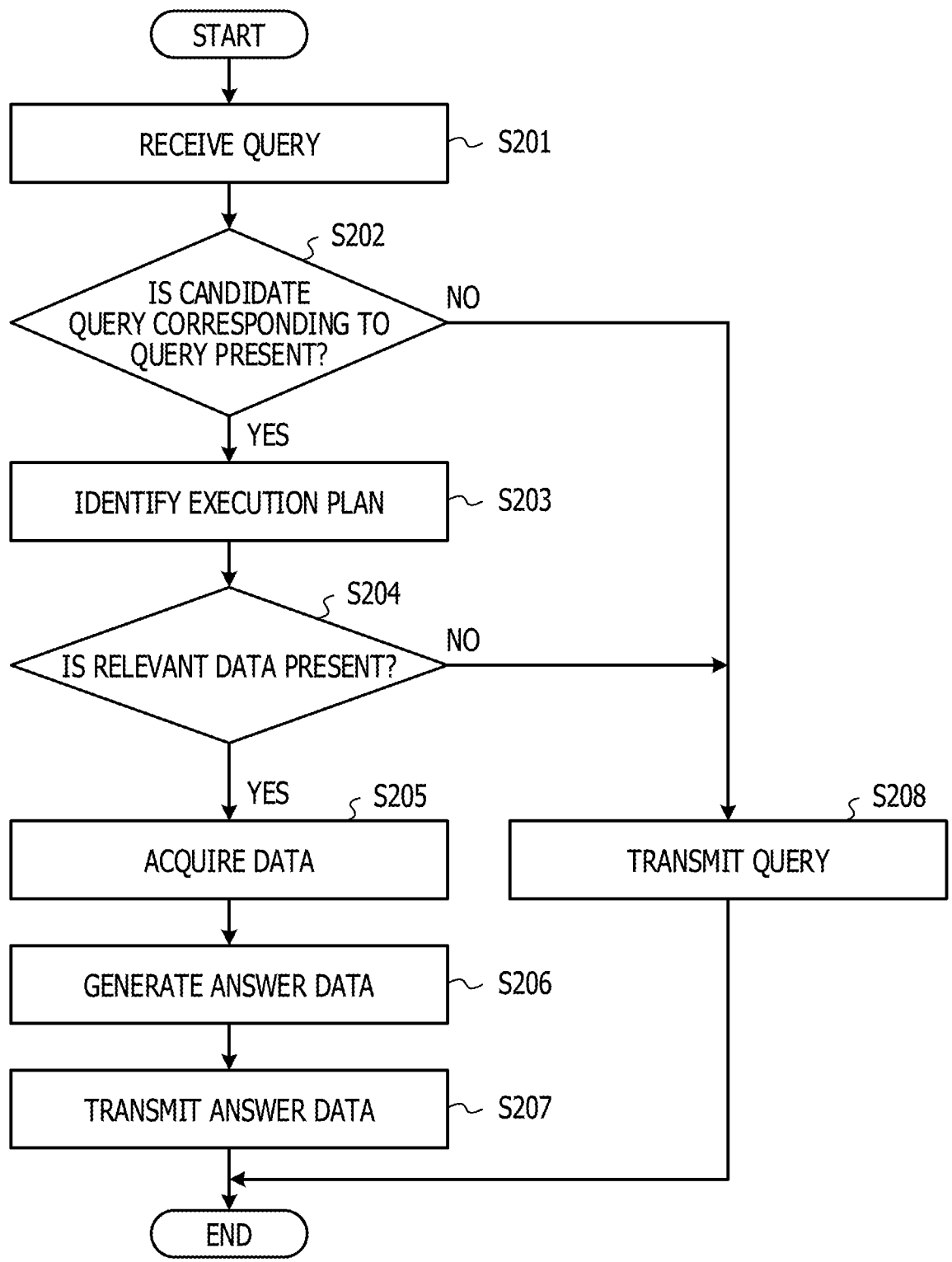
FIG. 6 is a flowchart illustrating an example of processing steps performed by the cache server.

An example of processing steps for a query performed by the cache server 10 according to the first embodiment will be described. FIG. 6 is a flowchart illustrating an example of the processing steps performed by the cache server 10. Note that the example exemplifies a case where a query includes data reference.

For example, the cache server 10 receives a query transmitted from the application server 12 (S201). The controller 31 judges whether a candidate query having content corresponding to the content of the SQL statement included in the received query is present (S202).

If a candidate query having the corresponding content is detected (Yes in S202), the controller 31 identifies an execution plan associated with the candidate query having the corresponding content in the execution plan cache 14 stored in the memory 32 (S203). The controller 31 judges whether data relevant to the identified execution plan is present in the cache database 15 (S204).

If it is judged that the data is present (Yes in S204), the controller 31 executes the identified execution plan and acquires the data relevant to the execution plan from the cache database 15 stored in the memory 32 (S205).

The controller 31 generates answer data for the query based on the acquired data (S206). The answer data may be, for example, tabular data. The controller 31 transmits the generated answer data as a response to the query to the application server 12 (S207).

If a candidate query having the corresponding content is not detected (No in S202), the controller 31 transmits the query to the database server 11 (S208). Also if it is judged that the data is not present (No in S204), the controller 31 transmits the query to the database server 11 (S208). In these cases, the database server 11 performs the processing as described above, and the cache server 10 receives the answer data and the execution plan generated by the database server 11.

From the above, the cache server 10 responds to the query from the application server 12 in some cases without causing the database server 11 to perform the processing. This reduces the processing load on the database server 11. In addition, the cache server 10 identifies the candidate query by performing comparison with the SQL statement included in the query and thus enables a response to a new query from the application server 12 without parsing the SQL statement and generating the execution plan by the cache server 10 and the database server 11.

Figure 7:
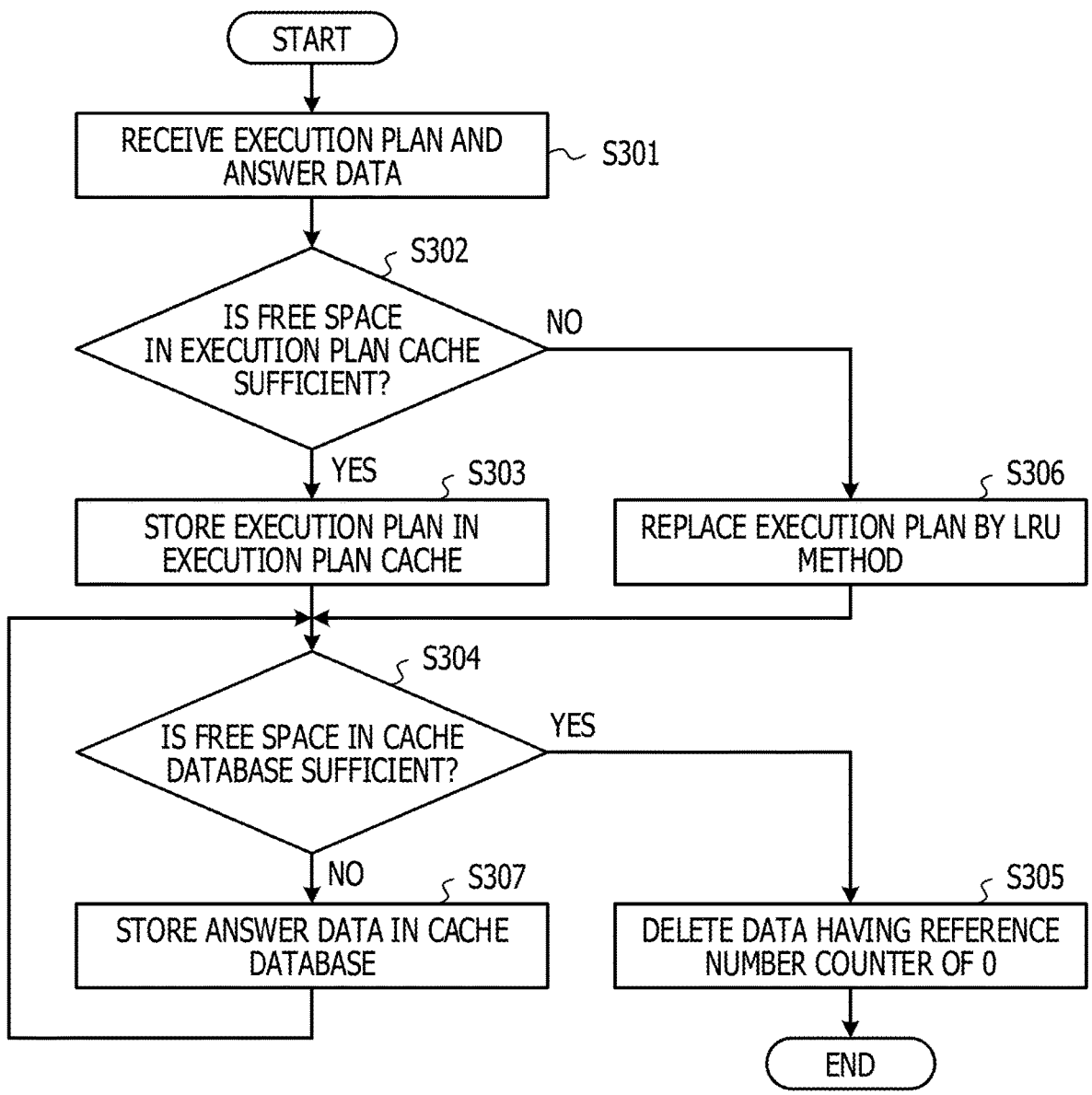
FIG. 7 is a flowchart illustrating an example of processing steps for storing in the cache database of the cache server.

Subsequently, an example of processing steps for storing in the cache database 15 of the cache server 10 according to the first embodiment will be described. FIG. 7 is a flowchart illustrating an example of the processing steps for storing in the cache database 15 of the cache server 10.

For example, the cache server 10 receives an execution plan and answer data from the database server 11 (S301). The controller 31 compares the received execution plan with free space in the execution plan cache 14 and thereby judges whether the free space in the execution plan cache 14 is sufficient or insufficient for the received execution plan (S302).

If it is judged that the free space in the execution plan cache 14 is sufficient (Yes in S302), the controller 31 stores the received execution plan in the execution plan cache 14 (S303).

If it is judged that the free space in the execution plan cache 14 is insufficient (No in S302), the controller 31 stores the received execution plan in the execution plan cache 14 in such a manner as to replace the oldest one of execution plans stored in the execution plan cache 14 with the received execution plan in accordance with the least recently used (LRU) method (S306).

After S303 or S306 is performed, the controller 31 compares the received answer data with free space in the cache database 15 and thereby judges whether the free space in the cache database 15 is sufficient or insufficient for the received answer data (S304).

If it is judged that the free space in the cache database 15 is sufficient (Yes in S304), the controller 31 stores the received answer data in the cache database 15 (S305).

If it is judged that the free space in the cache database 15 is insufficient (No in S304), the controller 31 identifies a piece of data having a reference number counter that indicates 0 among the pieces of data stored in the cache database 15 and deletes the identified piece of data from the cache database 15 (S307). The controller 31 performs S304 after S307.

The reference number counter is information indicating the number of execution plans based on which, for example, reference to a piece of data stored in the cache database 15 is made for each piece of data in the cache database 15 and that are stored in the execution plan cache 14. Specifically, first data having the reference number counter of 5 and stored in the cache database 15 is referred to on the basis of five execution plans stored in the execution plan cache 14. Specifically, when executing one of the five execution plans, the controller 31 acquires at least the first data from the cache database 15.

The reference number counter is exemplified based on each piece of data but is not limited to this. For example, execution plans may be counted for each table stored in the cache database 15.

Note that if data having the reference number counter of 0 is not present in S307, the controller 31 may repeat deleting the least recently used execution plan among the execution plans stored in the execution plan cache 14 until the reference number counter of any one of the pieces of data becomes 0.

The LRU method is exemplified in the processing in S306, but the method is not limited to this. The controller 31 may replace the least frequently used execution plan with the received execution plan in accordance with the least frequently used (LFU) method.

According to the first embodiment, the cache server 10 may respond to a query from the application server 12 without causing the database server 11 to perform the processing, and thus the processing load on the database server 11 may be reduced.

In addition, the cache server 10 may identify an execution plan without parsing the SQL statement included in a received query, and thus processing load and processing time involved with the SQL statement parsing and the execution plan generation may be saved.

Moreover, the cache server 10 includes the execution plan cache 14 and the cache database 15 in which part of the database 16 is reproduced, and thus executing an execution plan enables desired data to be acquired. The cache database 15 has the data structure in which the part of the database 16 is reproduced, and thus compared with, for example, a data structure in which a query or an execution plan and cache data (answer data) are held on a one-to-one correspondence basis, overlapping of cache data may be reduced, and thus data volume may be reduced.

Second Embodiment

Subsequently, a second embodiment will be described. The hardware configuration of the cache server 10 according to the second embodiment may be the same as that of the cache server 10 according to the first embodiment, and thus description thereof is omitted.

Hereinafter, specific operations of the cache server 10 according to the second embodiment will be exemplified. When receiving a new query from the application server 12, the controller 31 of the cache server 10 normalizes the SQL statement included in the query. FIG. 8 is a diagram illustrating an example of the normalization of SQL statements. Examples of the normalization include deleting a space character or a comment included in the SQL statement and changing the order of character strings in accordance with a given rule.

The controller 31 compares the normalized query with each candidate query associated with an execution plan in the execution plan cache 14 and thereby judges whether a candidate query having content corresponding to the content of the normalized query is present. In this case, each candidate query may be normalized in advance or may be normalized at the time of the comparison step and then compared.

If a candidate query having content corresponding to the content of the normalized query is detected, an execution plan associated with the detected candidate query is identified, and the identified execution plan is executed. The controller 31 executes the execution plan, thereby generates answer data from the cache database 15, and transmits the answer data as a response to the query to the application server 12 on behalf of the database server 11.

If a candidate query having content corresponding to the content of the normalized query is not detected, the controller 31 transmits the received query to the database server 11.

Figure 9:
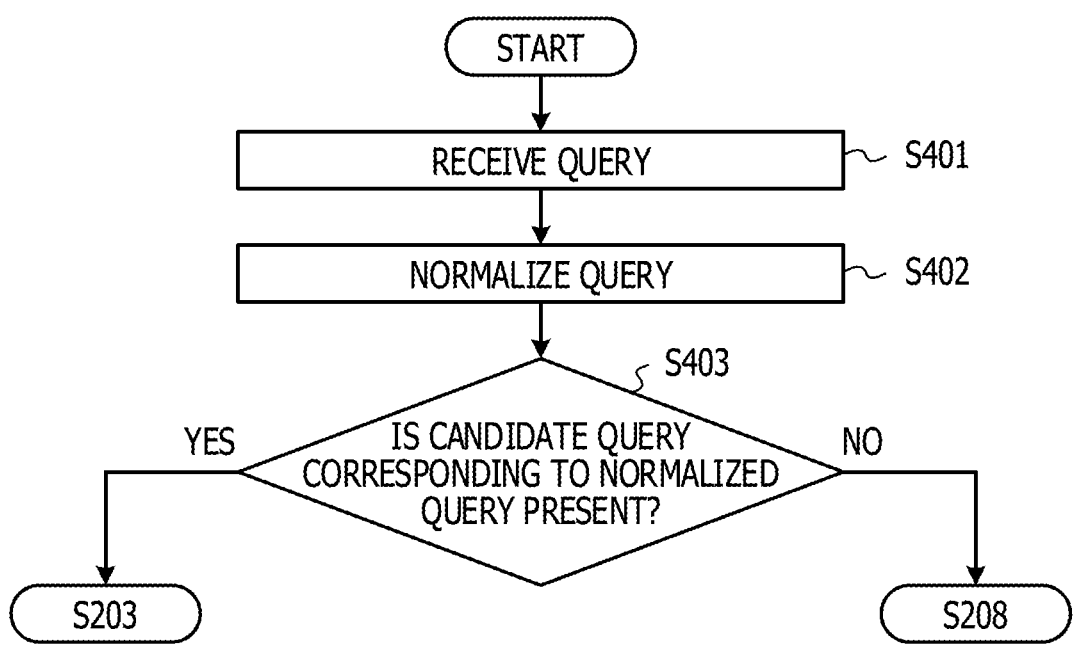
FIG. 9 is a flowchart illustrating an example of processing steps performed by the cache server.

An example of the processing steps for a query performed by the cache server 10 according to the second embodiment will be described. FIG. 9 is a flowchart illustrating an example of the processing steps performed by the cache server 10. Note that the example exemplifies a case where a query includes data reference.

For example, the cache server 10 receives a query transmitted from the application server 12 (S401). The controller 31 normalizes the SQL statement included in the received query (S402). The controller 31 judges whether a candidate query having content corresponding to the content of the normalized query is present (S403).

If a candidate query having the corresponding content is detected (Yes in S403), the controller 31 performs S203 and succeeding steps.

If a candidate query having the corresponding content is not detected (No in S403), the controller 31 performs S208. In addition, if it is judged that data is not present (No in S204), the controller 31 transmits the query to the database server 11 (S208). In these cases, the database server 11 performs the processing as described above, and the cache server 10 receives answer data and an execution plan generated by the database server 11.

According to the second embodiment, the cache server 10 may improve a cache hit ratio for a query from the application server 12. Specifically, for example, even if there is a difference due to a space character or a comment in a character string of a described SQL statement, the normalization performed by the cache server 10 on a SQL statement enables identification of a candidate query having a cached SQL statement having the other descriptions corresponding to the content of the query.

Third Embodiment

Subsequently, a third embodiment will be described. The hardware configuration of the database server 11 according to the third embodiment may be the same as that of the database server 11 according to the first embodiment, and thus description thereof is omitted.

Hereinafter, specific operations of the cache server 10 according to the third embodiment will be exemplified. The database server 11 receives a query regarding updating data directly from the application server 12 or indirectly via the cache server 10. Updating data may include, for example, updating, adding, and deleting data. In the SQL, an UPDATE statement, an INSERT statement, and a DELETE statement respectively correspond to updating, adding, and deleting data.

The controller 21 of the database server 11 parses the SQL statement included in the received query and generates an execution plan associated with the received query based on the definition information of the database 16. The controller 21 executes the generated execution plan and thereby updates data included in the database 16.

The controller 21 refers to cache management information in which pieces of data stored in the cache database 15 among pieces of data included in the database 16 are recorded and judges whether the piece of updated data has an influence on the cache database 15.

If the update process has an influence on the cache database 15, the controller 21 instructs the cache server 10 to update the cache database 15.

Figure 10:
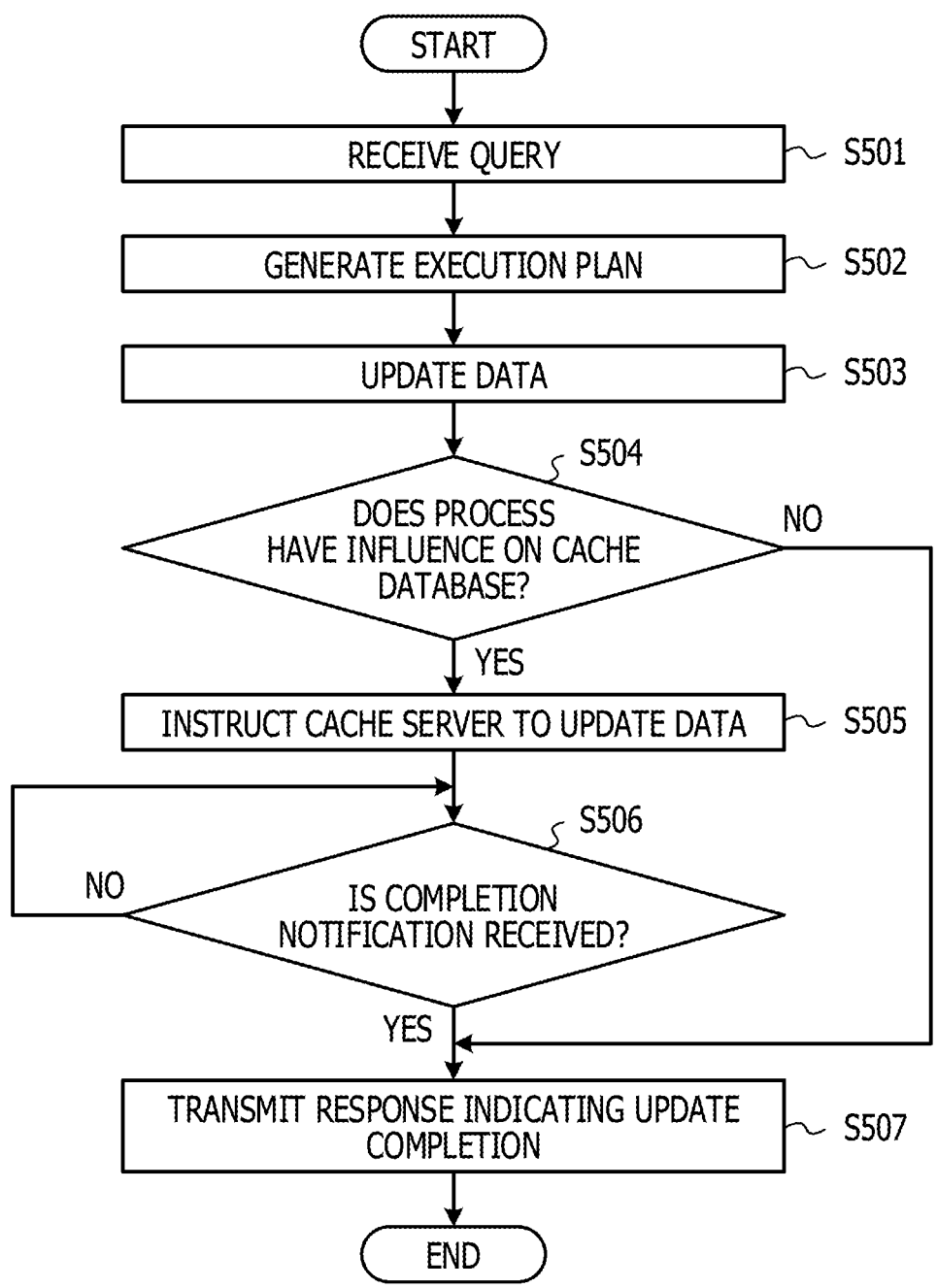
FIG. 10 is a flowchart illustrating an example of update-related processing steps performed by the database server.

Subsequently, an example of update-related processing steps performed by the database server 11 according to the third embodiment will be described. FIG. 10 is a flowchart illustrating an example of the update-related processing steps performed by the database server 11. Note that the example exemplifies a case where a query incudes a data update.

For example, the database server 11 receives a query regarding an update transmitted from the application server 12 via the cache server 10 (S501). The controller 21 parses the SQL statement included in the received query based on the definition information of the database 16 and generates an execution plan associated with the query (S502).

The controller 21 executes the generated execution plan and updates data included in the database 16 stored in the memory 22 (S503). The controller 21 judges whether the process for updating the database 16 has an influence on the cache database 15 of the cache server 10 (S504).

If the update process has an influence on the cache database 15 (Yes in S504), the controller 21 transmits an instruction to the cache server 10 to instruct the cache database 15 to execute the process for updating same data as the updated data (S505). The controller 21 judges whether a notification indicating the completion of the update is received from the cache database 15 (S506).

If a completion notification is received (Yes in S506), the controller 21 controls the communication device 23 and transmits, to the cache server 10, a response indicating the update completion in response to the query (S507).

If a completion notification is not received (No in S506), the controller 21 waits until the completion notification is received from the cache server 10.

If the update process does not have an influence on the cache database 15 (No in S504), the controller 21 controls the communication device 23 and transmits, to the cache server 10, a response indicating the update completion in response to the query (S507).

Note that if there is a plurality of cache servers 10, the database server 11 may be configured not to respond to the query until the completion notification from every cache server 10 is received.

According to the third embodiment, in a case where a query regarding updating data in the database 16 is transmitted, the database server 11 does not transmit a response indicating the completion of the update process in response to the query until the process for updating data in the cache database 15 is completed, and thus data inconsistency between the database 16 and the cache database 15 may be restrained.

In addition, if the process for updating the database 16 is such an update that changes the definition of a table such as adding a column to the table, the database server 11 may instruct the cache server 10 to delete an execution plan to be influenced by the update process among the execution plans stored in the execution plan cache 14.

In this case, the cache server 10 may receive update details from the database server 11, identify the execution plan for referring to the data to be updated in the update process from the execution plan cache 14, and delete the identified execution plan.

Moreover, in accordance with the updated database 16, the database server 11 may generate a latest execution plan for the corresponding execution plan stored in the execution plan cache 14 and to be influenced by the update process and may transmit the latest execution plan to the cache server 10.

The configuration and procedures of each above-described embodiment are not limited to those described above. Modifications, combination changes, and the like may appropriately be made without departing from the spirit of the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data providing apparatus comprising:
circuitry configured to:
store a query as a candidate query in a first memory in association with an execution plan and store data in a second memory when receiving the execution plan and the data from a database server in response to transmitting the query to the database server;
perform searching the first memory for a first candidate query having content corresponding to content of a first query in response to receiving the first query from an application server;
when the first candidate query is detected by the searching, select a first execution plan associated with the first candidate query by referring to the first memory, extract specific data from the second memory on the basis of the selected first execution plan, and transmit the specific data to the application server; and
when the first candidate query is not detected by the searching, transmit the first query through the application server to the database server, the database server is configured to:
receive the first query sent from the data providing apparatus which receives the first query sent from the application server,
create the execution plan based on the received first query;
acquire data corresponding to the execution plan from a database stored in a storage device;
create response data for the first query based on the acquired data; and
send the response data and the execution plan to the data providing apparatus,
a cache server is configured to:
receive the response data and the execution plan sent from the database server; and
send, to the application server, the received response data.

2. The data providing apparatus according to claim 1, wherein
the query is described in a query language,
the execution plan is generated by performing parsing of the query, the parsing regarding the query language, and
the searching is performed without performing the parsing of the first query.

3. The data providing apparatus according to claim 1, wherein a data structure of the second memory is equivalent to at least a part of a data structure of the database.

4. The data providing apparatus according to claim 1, wherein the searching includes normalizing the content of the first query and searching for the first candidate query having content corresponding to the normalized content of the first query.

5. The data providing apparatus according to claim 1, the circuitry further configured to, when receiving information regarding data update from the database server, execute update of data stored in the second memory on the basis of the information.

6. The data providing apparatus according to claim 1, the circuitry further configured to, when receiving information regarding data update from the database server, delete a specific execution plan from the first memory on the basis of the information, the specific execution plan being influenced by the data update.

7. The data providing apparatus according to claim 1, wherein, if the first query is transmitted to the database server,
a first execution plan is generated on the basis of the first query in the database server,
first data is extracted from the database on the basis of the execution plan in the database server, and
the first data and the first execution plan are transmitted to the data providing apparatus from the database server.

8. A computer-implemented data providing method for a computer to execute a process comprising:
storing a query as a candidate query in a first memory in association with an execution plan and store data in a second memory when receiving the execution plan and the data from a database server in response to transmitting the query to the database server;
searching the first memory for a first candidate query having content corresponding to content of a first query in response to receiving the first query from an application server;
when the first candidate query is detected by the searching, selecting a first execution plan associated with the first candidate query by referring to the first memory, extracting specific data from the second memory on the basis of the selected first execution plan, and transmitting the specific data to the application server; and
when the first candidate query is not detected by the searching, transmitting the first query through the application server to the database server,
the database server is configured to:
receive the first query sent from a data providing apparatus which receives the first query sent from the application server;
create the execution plan based on the received first query;
acquire data corresponding to the execution plan from a database stored in a storage device;
create response data for the first query based on the acquired data; and
send the response data and the execution plan to the data providing apparatus,
a cached server is configured to:
receive the response data and the execution plan sent from the database server; and
send, to the application server, the received response data.

9. The data providing method according to claim 8, wherein
the query is described in a query language,
the execution plan is generated by performing parsing of the query, the parsing regarding the query language, and
the searching is performed without performing the parsing of the first query.

10. The data providing method according to claim 8, wherein a data structure of the second memory is equivalent to at least a part of a data structure of the database.

11. The data providing method according to claim 8, wherein the searching includes normalizing the content of the first query and searching for the first candidate query having content corresponding to the normalized content of the first query.

12. The data providing method according to claim 8, further comprising: when receiving information regarding data update from the database server, executing update of data stored in the second memory on the basis of the information.

13. The data providing method according to claim 8, further comprising: when receiving information regarding data update from the database server, deleting a specific execution plan from the first memory on the basis of the information, the specific execution plan being influenced by the data update.

14. The data providing method according to claim 8, wherein, if the first query is transmitted to the database server,
- a first execution plan is generated on the basis of the first query in the database server,
- first data is extracted from the database on the basis of the execution plan in the database server, and
- the first data and the first execution plan are transmitted to the data providing apparatus from the database server.

15. A non-transitory computer-readable medium storing a data providing program that causes a computer to execute a process comprising:
- storing a query as a candidate query in a first memory in association with an execution plan and store data in a second memory when receiving the execution plan and the data from a database server in response to transmitting the query to the database server;
- searching the first memory for a first candidate query having content corresponding to content of a first query in response to receiving the first query from an application server;
- when the first candidate query is detected by the searching, selecting a first execution plan associated with the first candidate query by referring to the first memory, extracting specific data from the second memory on the basis of the selected first execution plan, and transmitting the specific data to the application server; and
- when the first candidate query is not detected by the searching, transmitting the first query through the application server to the database server, the database server is configured to:
- receive the first query sent from a data providing apparatus which receives the first query sent from the application server;
- create the execution plan based on the received first query;
- acquire data corresponding to the execution plan from a database stored in a storage device;
- create response data for the first query based on the acquired data; and
- send the response data and the execution plan to the data providing apparatus, a cache server is configured to:
- receive the response data and the execution plan sent from the database server; and
- send, to the application server, the received response data.

\* \* \* \* \*